(12) United States Patent
Baloukas et al.

(10) Patent No.: US 8,064,632 B2
(45) Date of Patent: Nov. 22, 2011

(54) INTERFERENCE SECURITY IMAGE STRUCTURE

(75) Inventors: Bill Baloukas, Montreal (CA); Ludvik Martinu, Montreal (CA)

(73) Assignee: Corporation de l'Ecole Polytechnique de Montf, Montréal, Québec (CA)

( * ) Notice: Subject to any disclaimer, the term of this patent is extended or adjusted under 35 U.S.C. 154(b) by 990 days.

(21) Appl. No.: 11/738,674

(22) Filed: Apr. 23, 2007

(65) Prior Publication Data

US 2008/0031508 A1 Feb. 7, 2008

Related U.S. Application Data

(60) Provisional application No. 60/745,404, filed on Apr. 22, 2006.

(51) Int. Cl.
*G06K 9/00* (2006.01)
(52) U.S. Cl. ......... 382/100; 359/359; 359/585; 359/589
(58) Field of Classification Search ............... 382/100, 382/260; 359/359, 360, 582, 585–589; 427/524
See application file for complete search history.

(56) References Cited

U.S. PATENT DOCUMENTS

| | | | | |
|---|---|---|---|---|
| 4,705,356 A | * | 11/1987 | Berning et al. | 359/590 |
| 4,735,869 A | * | 4/1988 | Morita | 428/702 |
| 4,779,898 A | * | 10/1988 | Berning et al. | 283/58 |
| 5,766,738 A | | 6/1998 | Phillips et al. | |
| 6,114,018 A | * | 9/2000 | Phillips et al. | 428/200 |
| 6,210,777 B1 | * | 4/2001 | Vermeulen et al. | 428/195.1 |
| 6,471,248 B2 | * | 10/2002 | Hardwick et al. | 283/72 |
| 7,040,664 B2 | * | 5/2006 | Taylor et al. | 283/72 |
| 2003/0035972 A1 | * | 2/2003 | Hanson et al. | 428/480 |
| 2003/0136848 A1 | * | 7/2003 | Kiekhaefer | 235/487 |
| 2006/0228553 A1 | * | 10/2006 | Argoitia et al. | 428/403 |
| 2008/0149713 A1 | * | 6/2008 | Brundage | 235/435 |

OTHER PUBLICATIONS

R. Goodale, Bank of Canada's Annual Report 2003, Ottawa, Canada, 2003.
H.A.M. de Heij, A method for measuring the public's appreciation and knowledge of banknotes, Proceedings of the SPIE-13 The International Society for Optical Engineering, vol. 4677, pp. 15-55, 2002.
L.A. DiNunzio, S.E. Chuch, Evaluating Public Awareness of New Currency Design Features, Proceedings of the SPIE—The International Society for Optical Engineering, vol. 4677, pp. 1-14, 2002.
R. van Renesse, Optical Document Security—Second Edition, Artech House, London, England, 1998.

(Continued)

*Primary Examiner* — Jason M Repko
*Assistant Examiner* — Shervin Nakhjavan
(74) *Attorney, Agent, or Firm* — Anglehart et al.

(57) ABSTRACT

An interference filter having a plurality of layers and a spectrum as a function of angle of observation is combined with a metameric element adjacent the interference filter and appearing to have a same color as the interference filter at at least one angle of observation and a contrasting color as said interference filter at least one other angle of observation. A plurality of interference filter layers, including a metallic layer, can be provided on a support structure for the layers. The support structure is then adapted to allow the layers to be seen from a top and a bottom side, with the layers being adapted to have different spectra as a function of angle of observation in reflection and transmission.

20 Claims, 6 Drawing Sheets 0 degrees 50 degrees

OTHER PUBLICATIONS

A. Argoitia, V.P. Raksha, R.W. phillips, Integration of contrasting technologies into advanced optical security devices, Proceedings of the SPIE—The International Society for Optical Engineering, vol. 5310, No. 1, pp. 299-311, 2004.

L.A. DiNunzio, L. Clarke, The new color of money: safer, smarter, more secure, Proceedings of the SPIE—The International Society of Optical Engineering, vol. 5310, No. 1, pp. 425-439, 2004.

J.A. Drobrowolski, F.C. Ho and A. Waldorf, Research of thin film anticounterfeiting coatings at the National Research Council of Canada, Applied Optics, vol. 28, Nos. 14, 15, Jul. 1989.

R.W. Phillips, and A.F. Bleikolm, Optical coatings for document security, Applied Optics, vol. 35, No. 28, 1996.

R.W. Phillips, and M. Nofi, Colors by Chemistry or by Physics?, Society of Vacuum Coaters, 42nd Annual Technical Conference Proceedings, 1999.

T. Jagielinski, Magnetic Imaging of Currencies and Secure Documents, Proceedings of the SPIE—The International Society for Optical Engineering, vol. 4677, pp. 159-168, 2002.

P.G. Coombs, V.P. Raksha, T. Markantes, Overt and covert verification via magnetic optical security devices, Proceedings of the SPIE—The International Society for Optical Engineering, vol. 4677, pp. 182-193, 2002.

D.B. Judd, and G. Wyszecki, Color in Business, Science and Industry, John Wiley & Sons, New York, USA, p. 176, 1975.

G. Wyszecki, Color Science, 2nd Edition, John Wiley & Sons, New York, USA, 1982.

M.R. Luo, G. Cui, B. Rigg, The Development of the CIE 2000 Colour-Difference Formula: CIEDE2000, Color research and application, vol. 26, No. 5, Oct. 2001.

B. Hill, Th. Roger, and F.W. Vorhagen, Comparative analysis of the quantization of color spaces on the basis of the CIELAB color-difference formula, ACM Transactions on Graphics, vol. 16, No. 2, pp. 109-154, Apr. 1997.

H. A. Macleod, Thin-Film Optical Filters, 3rd Edition, Institute of Physics Publishing, Philadelphia, USA, p. 53. 1986.

\* cited by examiner

0 degrees    50 degrees

FIG. 11

INTERFERENCE SECURITY IMAGE STRUCTURE

FIELD OF THE INVENTION

The present invention relates to optically variable devices (OVD) used for secure documents, such as identity documents, banknotes, credit cards and cheques.

BACKGROUND OF THE INVENTION

Fast progress in color reprographic technology combined with a rise of criminal and terrorist activity stimulates the need for new and enhanced security features to be incorporated in financial and identity documents in order to stay one step ahead of counterfeiters.

In early 2000, fraud was at an all-time high. The Bank of Canada's annual report shows that the value of counterfeit banknotes detected in circulation rose from 4.9 million dollars in 2002 to $12.7 million in 2003 (see "Bank of Canada's Annual Report 2003", Ottawa, Canada, 2003 by R. Goodale). One who deals with security will inevitably have to deal with the issue of counterfeiting, be it in the domain of immigration (passports, ID cards, etc.), credit card fraud, drug trafficking, etc. It is therefore important to continuously innovate in the domain of anti-counterfeiting devices in order to stay one step ahead of present and future counterfeiters. It is also important to inform the general public about such devices. In fact, research has shown that only 1.7 currency security features are known in average, see the paper by H. A. M. de Heij, "A method for measuring the public's appreciation and knowledge of banknotes", Proceedings of the SPIE—The International Society for Optical Engineering, v 4677, 2002, p 15-55. Contrary to what is generally believed, more and more fake low currency bills are being found, simply due to the fact that most people anticipate that only high denominations are being reproduced, as said in, L. A. DiNunzio, S. E. Chuch, "Evaluating Public Awareness of New Currency Design Features", Proceedings of the SPIE—The International Society for Optical Engineering, v 4677, 2002, p 1-14.

Most optically variable devices (OVD), see *Optical Document Security—Second Edition*, by R. van Renesse, Artech House, London, England, 1998, are based on two optical effects: diffraction (Diffractive Optical Variable Image Device) and interference (Interference Security Image Structures, ISIS). The present trend consists of integrating these two effects into one device, as seen in, the paper by A. Argoitia, V. P. Raksha, R. W. Phillips, "Integration of contrasting technologies into advanced optical security devices", Proceedings of the SPIE—The International Society for Optical Engineering, v 5310, n 1, 2004, p 299-311.

In the case of ISIS, there is still much opportunity for innovation. Interference is an interesting effect for it offers a color change upon tilting the device. Consequently, it is impossible to recreate this effect by a simple photocopy, photography or any reprographic process. This feature is very important considering the fact that introduction of high quality inexpensive printers has had a direct effect on the number of false bills in circulation. In 1995, less than 1% of counterfeited bills in the U.S. were digitally fabricated, compared to almost 40% in 2002, see the paper by L. A. DiNunzio, L. Clarke, "The new color of money: safer, smarter, more secure", Proceedings of the SPIE—The International Society for Optical Engineering, v 5310, n 1, 2004, p 425-439. The first ISIS device of this type was developed at the National Research Council of Canada, see the article by J. A. Drobrowolski, F. C. Ho and A. Waldorf, "Research on thin film anticounterfeiting coatings at the National Research Council of Canada", Applied Optics, Vol. 28, No 14, 15 July 1989. The original design consisted of 13 dielectric layers, offering a gold to green color shift. For economic reasons, over the years, the number of layers was brought down to five and later to three by using metallic layers.

Another example is optically variable ink which is being used on many international currencies (over 40 countries) as described in the article by R. W. Phillips, and A. F. Bleikolm, "Optical coatings for document security", Applied Optics, Vol. 35 and R. W. Phillips, and M. Nofi, "Colors by Chemistry or by physics?", Society of Vacuum Coaters, $42^{nd}$ annual technical conference proceedings, 1999. No. 28. 1996. This ink has also been combined with magnetic elements as described in the paper by T. Jagielinski, "Magnetic Imaging of Currencies and Secure Documents", Proceedings of the SPIE—The International Society for Optical Engineering, v 4677, 2002, p 159-168. and P. G. Coombs, V. P. Raksha, T. Markantes, "Overt and covert verification via magnetic optical security devices", Proceedings of the SPIE—The International Society for Optical Engineering, v 4677, 2002, p 182-193.

BRIEF DESCRIPTION OF THE DRAWINGS

The invention will be better understood by way of the following description with reference to the appended drawings, in which.

DETAILED DESCRIPTION OF THE INVENTION

In the present work, two types of innovative devices have been designed and fabricated. The first one relies on a hidden image concept, the second one on an unexpected optical effect. In general, one may expect that the description of such devices could minimise their future efficiency. In fact, it is important to know that it is not the design of the device itself that offers protection, but its fabrication, which would be very costly and complicated for a counterfeiter.

The device considered here relies on the metameric phenomenon. Metameric stimuli can be defined as different spectra having the same tristimulus values under a specific illuminant. As a rule of thumb, the reflection or transmission spectra of two different objects must intersect at least at three points in the visible spectrum in order for metamerism to be possible, see the article by D. B. Judd, and G. Wyszecki, in "*Color in Business, Science and Industry*, John Wiley & Sons, New York, USA, 1975, page 176. The higher the number of intersections, the higher the possibility that these two objects will be metameric under more than one illuminant (the infinite case being two identical spectra). It is also very rare that a pair of colors will be metameric for all observers. Therefore, perfect metamerism is practically impossible. The degree of metamerism, as described in the paper by G. Wyszecki, *Color Science,* 2nd edition, John Willey & Sons, NY, USA, 1982, MI (where the index indicates the illuminant), is given by the color difference under a particular illuminant. This color difference can be calculated in the L*a*b* color space (for more details see the reference by M. R. Luo, G. Cui, B. Rigg, "The Development of the CIE 2000 Colour-Difference Formula: CIEDE2000", COLOR research and application, Volume 26, Number 5, October 2001):

$$M_I = [(\Delta a^*)^2 + (\Delta b^*)^2 + (\Delta L^*)^2]^{1/2}$$

where L*, a* and b* are given by $$L^* = 116 \left(\frac{Y}{Y_0}\right)^{1/3} - 16 \quad Y/Y_0 > 0.008856$$

$$a^* = 500\left[\left(\frac{X}{X_0}\right)^{1/3} - \left(\frac{Y}{Y_0}\right)^{1/3}\right] \quad X/X_0 \text{ and } Y/Y_0 > 0.008856$$

$$b^* = 200\left[\left(\frac{Y}{Y_0}\right)^{1/3} - \left(\frac{Z}{Z_0}\right)^{1/3}\right] \quad Y/Y_0 \text{ and } Z/Z_0 > 0.008856$$

and XYZ are the color tristimulus of the sample, and $X_0$ $Y_0$ $Z_0$ are the white illuminant color tristimulus values.

In order to test the degree of metamerism of the filters, illuminants C (average daylight), A (incandescent lamplight) and F1 (fluorescent), defined by the International Commission on Illumination (CIE), are used.

In this patent application, the specific illuminant is understood to include a specific viewing or observation angle of the ISIS, either in reflection or transmission, namely the spectrum of the ISIS is considered as a function of viewing angle. When an ISIS is observed in reflection, the light is provided from the same side as the observer, whether by ambient lighting or a direct light source. Reflection ISIS can be used on a paper banknote or other opaque objects. When an ISIS is observed in transmission, ambient light or a direct light source is provided on the opposite side from the observer, and this is practical when the support on which the ISIS is provided is translucent or transparent. In both cases, the angle of observation results in a change in the observed color of the ISIS in accordance with its spectrum, the spectrum being the result of the ISIS layer composition and design.

Metameric filters have been fabricated using silicon dioxide ($SiO_2$: n=1.49 at 550 nm) and tantalum pentoxide ($Ta_2O_5$: n=2.14 at 550 nm). A Ta layer was used for the metal-dielectric filters. These materials were deposited using Dual Ion Beam Sputtering (DIBS; Spector©, Veeco-Ion Tech). Both beams are supplied from two Kaufman gridded ion sources. The first ion source with a 16 cm diameter is used to sputter $SiO_2$ or Ta targets. The second source (12 cm diameter) is used simultaneously to compact the deposited layer (ion beam assist). Since only time was monitored during fabrication, slight thickness errors are observed and these inevitably affect the obtained color of the filters. The chamber pressure was of 8.5×10-8 torr, and the beam parameters were the following: the energy for the sputtering ion-source was of 1250 eV, and its flux was 600 mA. As for the assist ion-source, its energy was of 400 eV, and its flux was 75 mA. Filters were applied on B270 glass and polycarbonate.

Filters were designed using TFCalc 5.1 from Spectra Inc. Color calculations were done using illuminant D65, which corresponds to average north sky daylight. The designed filters are therefore metameric under illuminant D65, and $M_{D65}$ is very close to zero.

Figure 1:
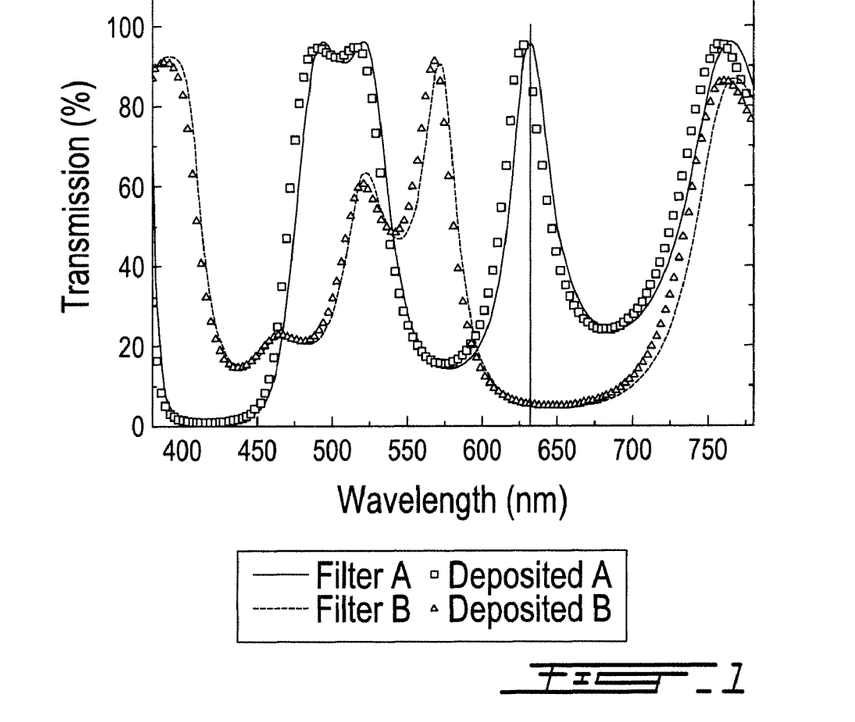
FIG. 1 illustrates transmission spectra of metameric filters A and B, in which only one data point out of three is presented for clarity purposes.

Two metameric filters (A and B) were designed and fabricated (see FIG. 1). Since these filters may evolve differently as a function of the observing angle, it is possible to create a complex image that will only appear at oblique angles. In order to increase the potential security offered by the device, the two filters, respectively, transmit at normal incidence 95% and 5% of light at 632.8 nm (the wavelength of a helium-neon laser—vertical line on FIG. 1). This characteristic offers a complementary verification method easily applied by an automated machine (second line inspection), for example, by scanning it with a laser as in barcodes.

TABLE 1

Layer thicknesses for filters A and B

| | | Thickness (nm) | |
|---|---|---|---|
| Layers | Material | Filter A | Filter B |
| 1 | $Ta_2O_5$ | 65.61 | 73.74 |
| 2 | $SiO_2$ | 151.61 | 117.61 |
| 3 | $Ta_2O_5$ | 63.94 | 79.55 |
| 4 | $SiO_2$ | 81.88 | 99.90 |
| 5 | $Ta_2O_5$ | 56.87 | 75.09 |
| 6 | $SiO_2$ | 63.40 | 139.43 |
| 7 | $Ta_2O_5$ | 38.69 | 66.14 |
| 8 | $SiO_2$ | 54.31 | 90.95 |
| 9 | $Ta_2O_5$ | 50.52 | 61.30 |
| 10 | $SiO_2$ | 66.54 | 76.34 |
| 11 | $Ta_2O_5$ | 50.65 | 19.62 |
| 12 | $SiO_2$ | 72.93 | 75.86 |
| 13 | $Ta_2O_5$ | 56.34 | 61.16 |
| 14 | $SiO_2$ | 81.03 | 90.70 |
| 15 | $Ta_2O_5$ | 62.02 | 63.80 |
| 16 | $SiO_2$ | 39.33 | |
| 17 | $Ta_2O_5$ | 24.65 | |
| 18 | $SiO_2$ | 84.07 | |
| 19 | $Ta_2O_5$ | 63.30 | |

Figure 2:
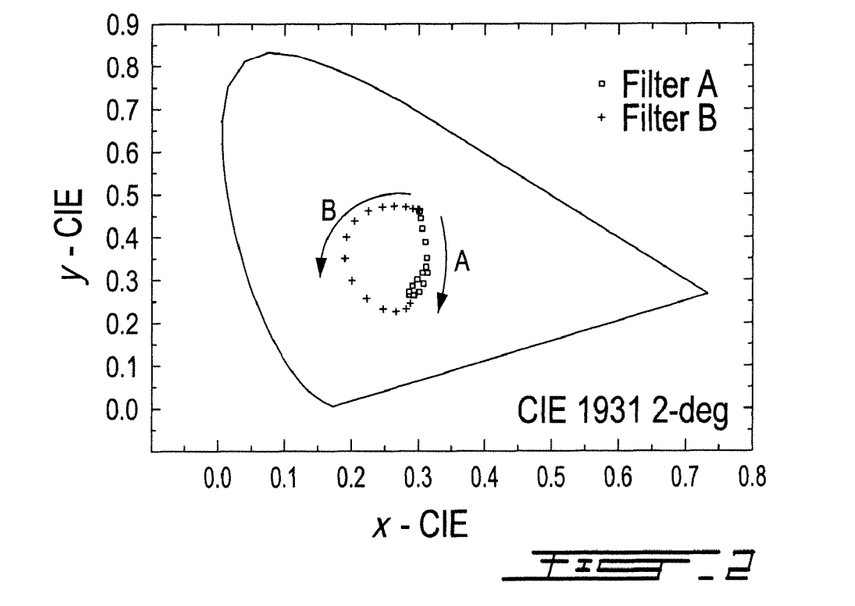
FIG. 2 illustrates color variation in the xyz color space for filters A and B.

Filter A consists of 19 layers and filter B of 15 layers (see table 1). As can be seen in FIG. 1, their spectra are very different. Optimized for a D65 illuminant, their colors are identical at normal incidence (in the case of perfectly deposited filters), but the similarity ends there. As the angle of incidence increases, their color paths diverge. Filter A varies from a green to purple to ashen color in transmission, while the color of filter B changes from a green to blue to finally purple color (see FIG. 2).

The filter performance is quite consistent with that expected from the design, despite the fact that only timing was used for process monitoring (see FIG. 1). One can observe that both spectra are slightly shifted toward the blue part of the visible spectrum indicating that the layers are probably thinner than designed (lower deposition rate than predicted). It is expected that using real time optical monitoring will eliminate this discrepancy.

Even if the transmission spectra of filters A and B are very similar to their respective design, their colors appear slightly different when viewed outdoors. This is particularly important in relation to the accuracy of the human eye. It is therefore interesting to study the metamerism index of these filters under different illuminants. For the designed filters, index $M_{D65}$ is equal to 0.23. $M_I$ values below 1 in the L*a*b* color space indicate that the eye cannot distinguish any difference between the two objects (see the paper by B. Hill, Th. Roger, and F. W. Vorhagen, "Comparative Analysis of the quantization of Color Spaces on the Basis of the CIELAB Color-Difference Formula", ACM Transactions on Graphics, Vol. 16, No. 2, April 1997, Pages 109-154). For the fabricated filters, $M_{D65}$=15.51; therefore, they appear different. Under other illuminants, the designed filters are no longer metameric (see table 2). Although in the case of illuminant C the difference in the perceived color is very subtle (MC is very close to one) this is not the case for illuminants A and F1. This behaviour was predictable taking into account that the two filters cross each other at only three wavelengths. For comparison, the RGB values are given in table 2.

Figure 11:
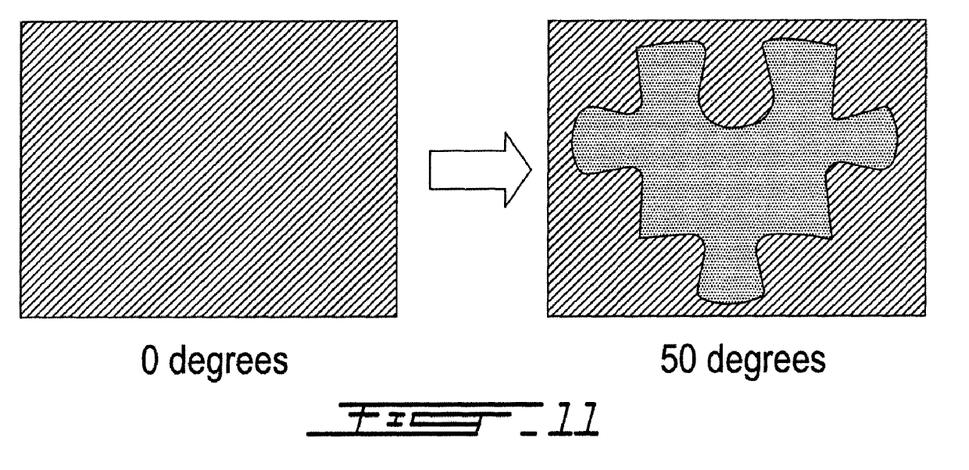
FIG. 11 illustrates a hidden image concept metameric filter arrangement.

As shown in FIG. 11, the metameric structure can be used to contain a hidden image. At one angle of observation, the hidden image is the same color as the surrounding element, such as at normal incidence, and the image is not seen. At another angle, such as 50 degrees, the hidden image has a contrasting color, and is readily perceived by a viewer. This makes for an easy to detect contrast effect as a function of viewing angle that is easier to perceive than a specific spectrum of an isolated ISIS device.

TABLE 2

Metameric index for filters A and B under different illuminants and their corresponding color coordinates.

| Illuminants | $M_I$ | Filter A - (x, y, Y)<br>Filter B - (x, y, Y) | Filter A - RGB<br>Filter B - RGB |
|---|---|---|---|
| Cie-D65 | 0.23 | (0.302, 0.462, 46.11)<br>(0.302, 0.461, 46.11) | (108, 201, 115)<br>(109, 201, 115) |
| Cie-C | 1.29 | (0.305, 0.449, 45.16)<br>(0.304, 0.451, 45.97) | (117, 197, 120)<br>(115, 199, 120) |
| Cie-A | 39.00 | (0.443, 0.445, 41.57)<br>(0.378, 0.524. 42.81) | (211, 166, 62)<br>(150, 189, 32) |
| Cie-F1 | 14.47 | (0.292, 0.477, 40.26)<br>(0.327, 0.470, 48.84) | (82, 192, 104)<br>(135, 203, 105) |

Figure 3:
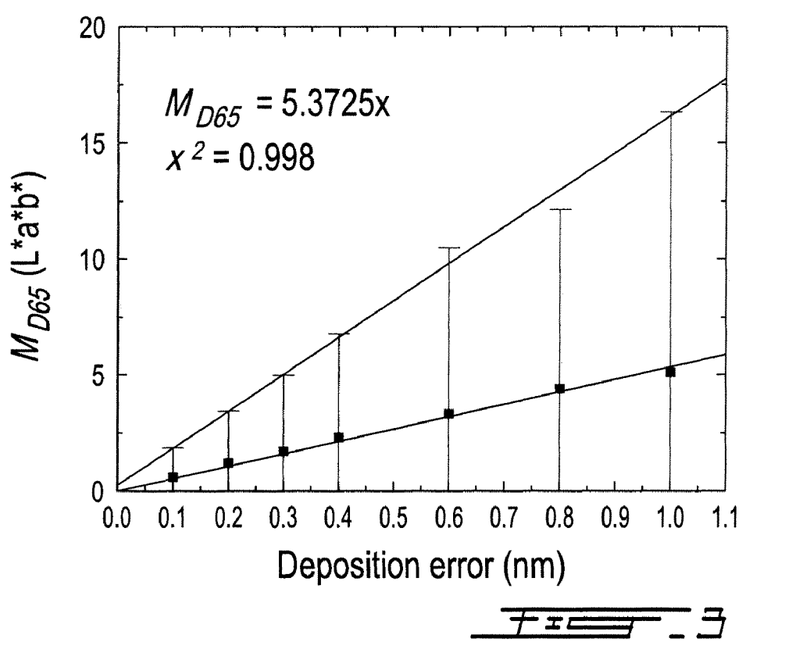
FIG. 3 illustrates MD65 as a function of deposition error for filter A.
Figure 4:
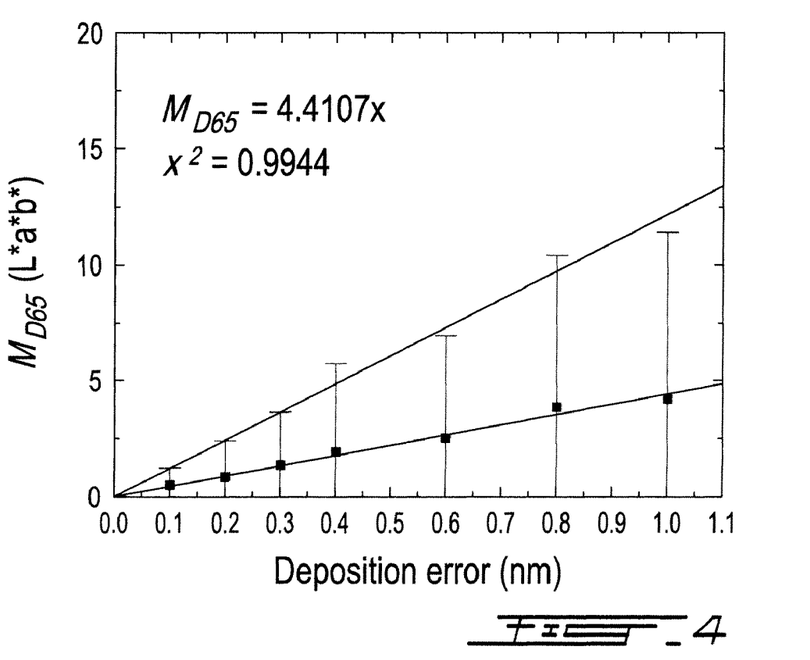
FIG. 4 illustrates MD65 as a function of deposition error for filter B.

It is interesting to study the evolution of the index of metamerism as a function of deposition errors. Using TFCalc, the worst case (used to estimate the minimum and maximum variation of the coating's performance) Monte Carlo absolute normal error was generated for each of the filter layers. For example, an error of 0.1 nm represents one standard deviation and the maximum errors generated by the program are within two standard deviations. 100 filters were therefore generated and their color differences compared with the original design color for different maximum thickness errors. FIGS. 3 and 4 show that for both filters, the average $M_{D65}$ value (representing the difference between the simulated filter and the theoretical design) increases linearly as does its standard deviation ($3\sigma$). Observing FIG. 3, we see that the metameric index for filter A increases more rapidly than for filter B (FIG. 4). It is consequently more sensitive to deposition errors. One of the reasons is that filter A consists of a higher number of layers.

Figure 5:
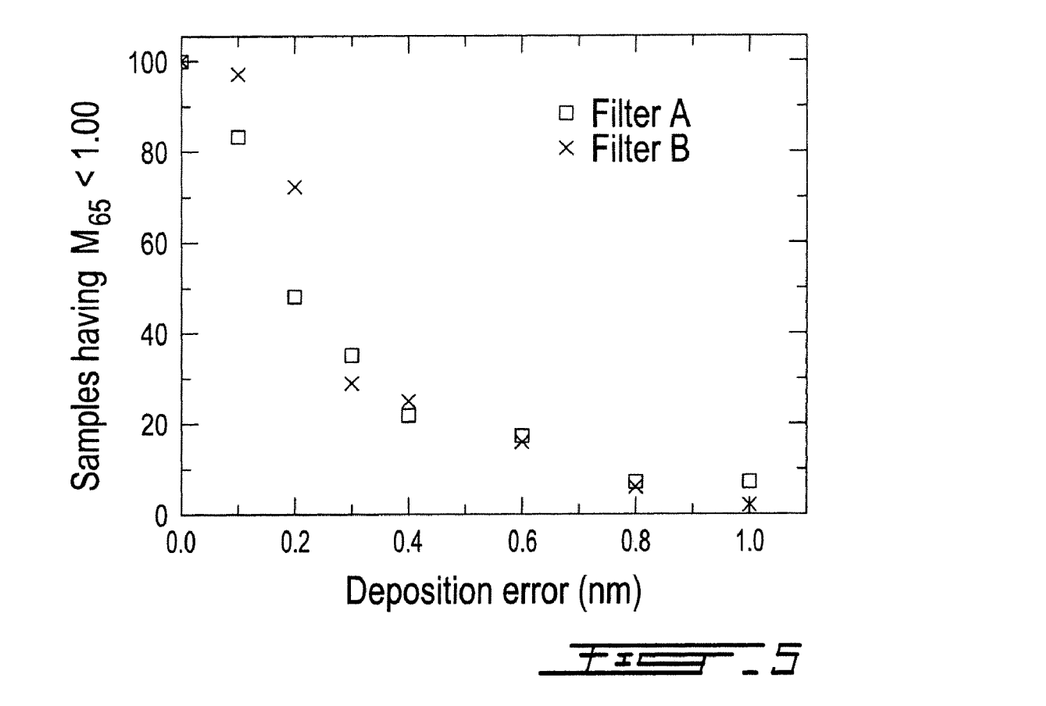
FIG. 5 illustrates MD65<1.00 for 100 samples as a function of deposition error.

$M_{D65}$ values have also been calculated for our experimentally deposited filters A and B, yielding $M_{D65-A}$=11.48 and $M_{D65-B}$=4.88, respectively. Using these values, we can deduce that the actual deposition process offered a maximum performance of 0.7 nm (normal error) on each layer. FIG. 5 shows simulated results, namely the number of filters out of 100 that have $M_{D65}$ values below one as a function of the deposition error. It is interesting to note that if the required production yield is of 80%, the accuracy needed to fabricate filter A must be close to 0.1 nm! This underlines that process stability is very important in order to maintain color consistency throughout repeated production cycles.

Since fabrication cost is usually an issue, one has to consider pathways to the reduction of the number of layers. In fact, incorporation of metal films can diminish the total number of layers, but it generally leads to reduced transmission. Also, the higher the difference between the high and low index materials, the higher the reflection will be at each interface, minimizing the number of layers necessary to obtain the desired effect. The materials used in this work had only a 0.65 difference; therefore a high number of layers was needed. The advantage of using all dielectric filters arises from the fact that they can be used in either transmission or reflection (deposited on a black background to eliminate the backside reflection), and offer a higher stability.

Another interesting optical effect can be obtained by using thin metallic layers. In the presence of absorbing thin films, the conservation of energy formula becomes A+T+R=100%, where A is the absorption, T the transmission and R the reflection. From the fundamental theorem, as shown in the reference by H. A. Macleod, *Thin-Film Optical Filters*, 3rd edition, Institute of Physics Publishing, Philadelphia, USA, 1986, page 53 that the transmission is independent of the direction by which light traverses all filters, and since R does not follow this rule, it follows that A also depends on the direction of the incident light. Using this effect, it is possible to design a filter which possesses a different appearance on both its sides, and that is also transparent. It is needless to say that this is an impressive optical effect, considering that the color variation is also present.

Figure 6:
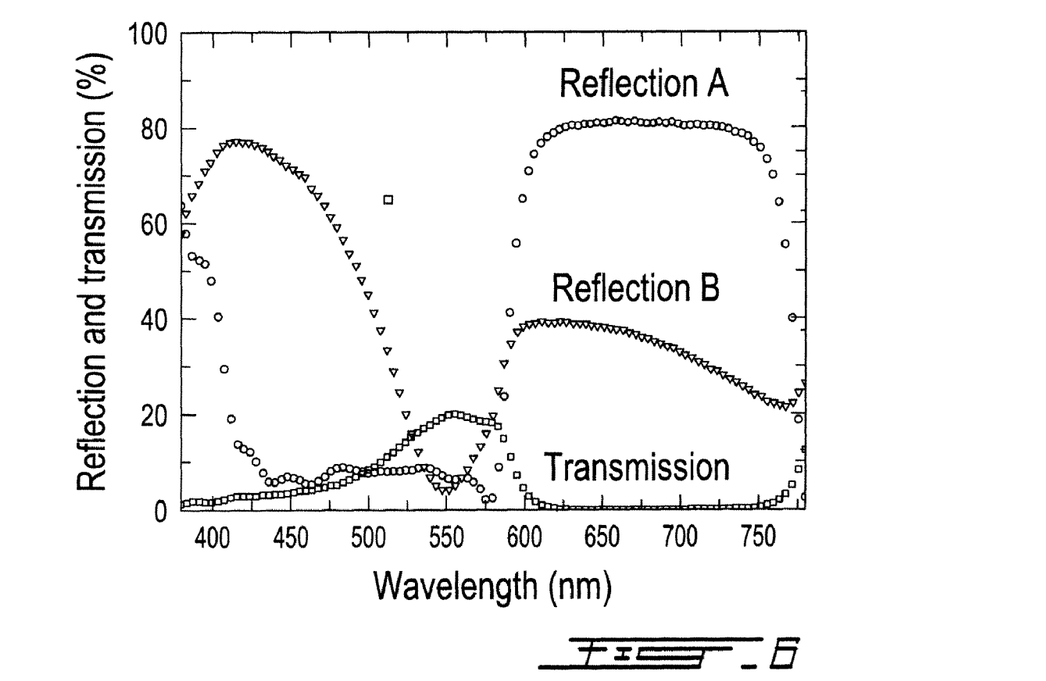
FIG. 6 illustrates transmission and reflection spectra for the dielectric/metal 26 layer filter, in which only one data point out of four is presented for clarity purposes.

As an example, we deposited a model filter consisting of 26 layers, the sixth layer being 30 nm of Ta. A high number of layers was simply used in order to maximize the optical effect that was mentioned earlier. It is shown in FIG. 6 that the reflection spectra are completely different depending on the side from which the substrate is observed. Consequently, this filter offers an impressive color variation as a function of the observation angle and side of observation: from red to yellow in reflection from side A, from a purple blue to white in reflection from side B, and from a yellowish green to green to finally blue in transmission. In order to reduce the number of layers, another filter containing nine layers was deposited which was also optically interesting. It is consequently possible to minimize the number of layers while maintaining the desired optical effect.

In order to increase the illumination stability as well as decrease to the cost of producing two metameric filters, it is also possible to create a hidden image effect by tailoring a filter using a specific material. This can be done either in reflection or in transmission depending on the requirements. Due to the fact that the material used is non iridescent, it is still possible to make an image appear; this is due to the fact that a change in the angle of incidence will lead to a variation of color of the filter.

It is important to note that one can benefit from an appropriate coincidence of the spectra of the filter for specific materials. This increases the possibility to preserve the metameric effect under a higher number of illumination sources, therefore conserving the hidden image effect.

In the case when the filters are to be used in reflection, one must use a material having a metallic appearance in order to mimic the interference filters (for example, metallic ink). In the case of a device used in transmission, one may use a colored polymer.

The filters presented here were designed and fabricated to be metameric in transmission and at normal incidence, but different angles can also be considered. The first step is to choose and characterize the non iridescent material that will be used, thus obtaining its reflection or transmission spectra. Once this is done, its colorimetric coordinates can be calculated under different types of lighting. This result is necessary in the design process. The second step consists of designing the filter that has the same color coordinates under the chosen light source and that matches the first material's spectrum as much as possible. The goal in this step is to obtain as many intersections between both of them as possible. The last step before fabrication is to make sure that the metameric effect is preserved under as many light sources as possible.

One should note that it is also possible to include a feature at a specific wavelength such that the material and filter have very different characteristics. This allows an optical verification method by using a laser, for example. At the same time the color variation must also be maximized in order for the hidden image effect to be striking.

Figure 7:
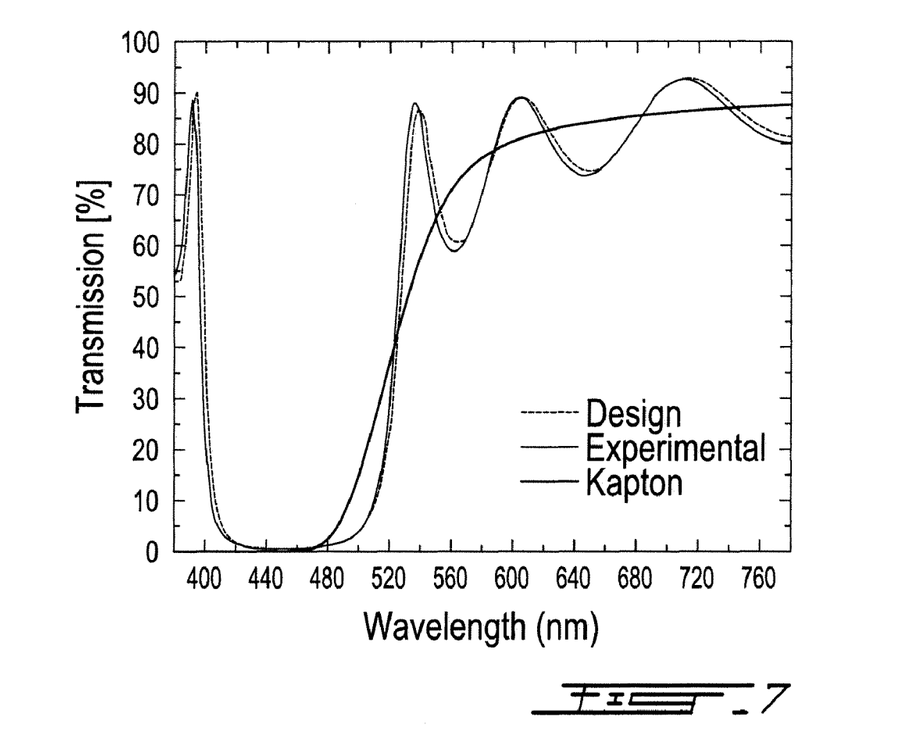
FIG. 7 illustrates transmission spectra for Kapton® polyimde showing the designed and deposited filter.

The first example shown here is an all-dielectric filter that was designed to be metameric with Du Pont's Kapton® polyimide, a yellowish polymer. As one can see in FIG. 7, the designed filter (having the layers of Table 4) and Kapton® possess very similar transmission spectra. They are metameric under illuminants D65, C and F1, and they exhibit a very good match under illuminant A (see Table 3).

TABLE 3

Index of metamerism between the filter and the Kapton film.

| Illuminant | Index of metamerism CIELAB) |
|---|---|
| D65 | 0.35 |
| C | 0.34 |
| A | 4.54 |
| F1 | 0.46 |

Figure 8:
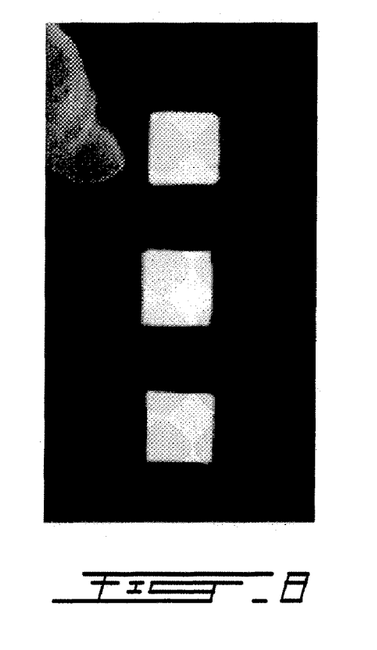
FIG. 8 shows a structure having Kapton® polyimide and film shown in transmission.

In this case, the color varies as a function of the observation angle from yellow to white. Also note that at 395 nm, there is a very large change in transmission, namely from 0% for Kapton to 90% for the filter, thus allowing a second level of verification. FIG. 8 shows a picture of the filter juxtaposed with two pieces of Kapton.

TABLE 4

Design of the yellow filter.

| Number | Material | Thickness(nm) |
|---|---|---|
| 1 | $SiO_2$ | 73.03 |
| 2 | $Ta_2O_5$ | 47.85 |
| 3 | $SiO_2$ | 72.93 |
| 4 | $Ta_2O_5$ | 49.57 |
| 5 | $SiO_2$ | 75.83 |
| 6 | $Ta_2O_5$ | 50.91 |
| 7 | $SiO_2$ | 77.71 |
| 8 | $Ta_2O_5$ | 51.66 |
| 9 | $SiO_2$ | 77.41 |
| 10 | $Ta_2O_5$ | 50.42 |
| 11 | $SiO_2$ | 75.57 |
| 12 | $Ta_2O_5$ | 50.72 |
| 13 | $SiO_2$ | 78.18 |
| 14 | $Ta_2O_5$ | 52.67 |
| 15 | $SiO_2$ | 79.38 |
| 16 | $Ta_2O_5$ | 53.47 |

Figure 9:
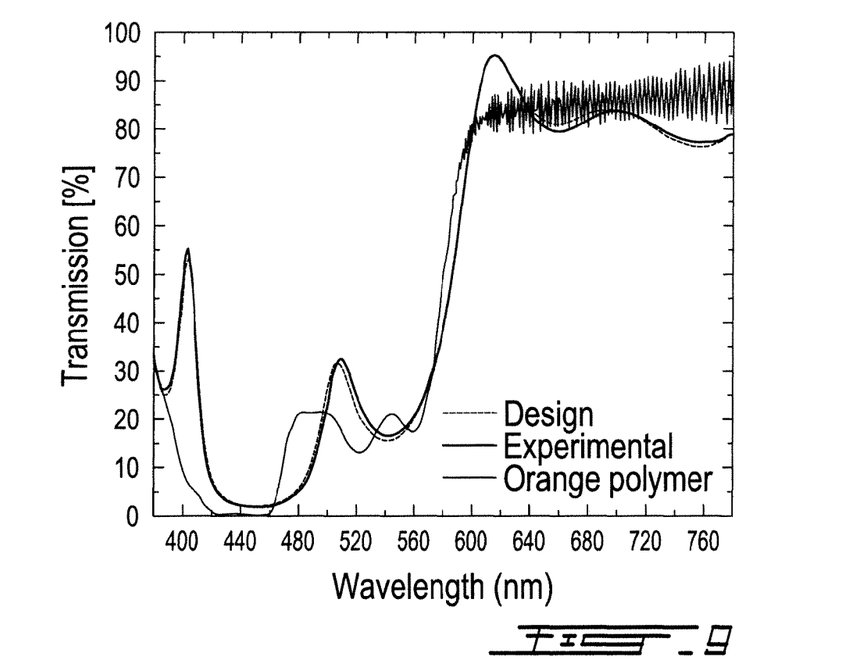
FIG. 9 illustrates transmission spectra for the orange polymer, and the designed and deposited optical filter.
Figure 10:
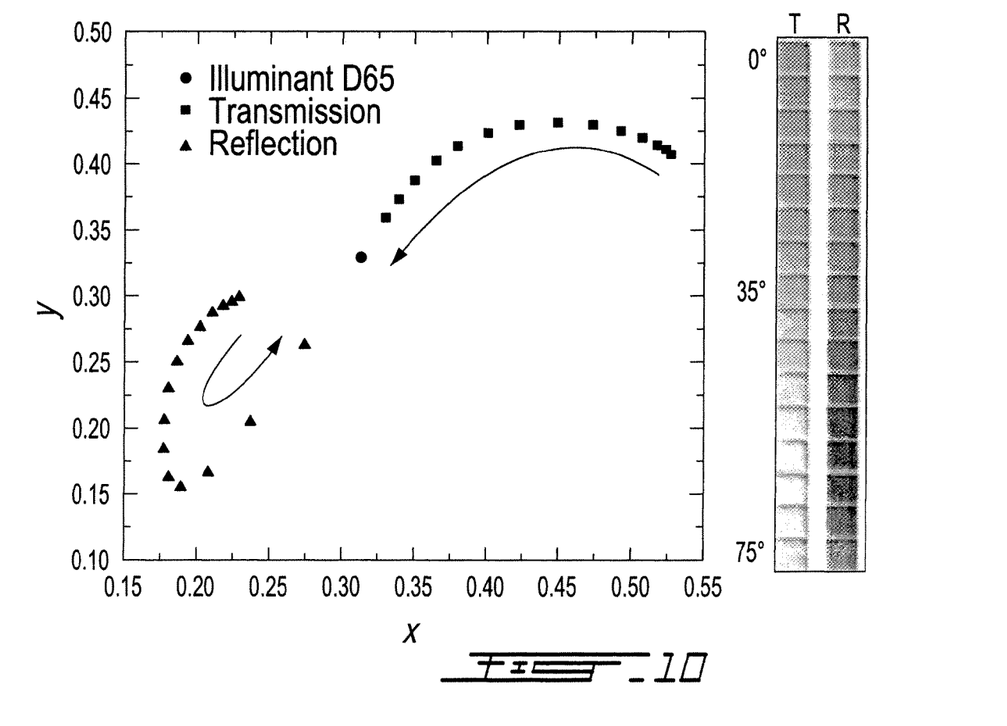
FIG. 10 illustrates color shift for the orange metameric filter.

The second example is another all dielectric filter (having layers of table 6) which is metameric with an orange polymer, thus allowing an orange to yellow color shift (see FIG. 9). Once again, it can be seen in FIG. 9 that the filter was tailored to match the polymer, thus obtaining a low index of metamerism for the chosen illuminants (see table 5).

TABLE 5

Index of metamerism between the optical filter and Kapton.

| Illuminant | Index of metamerism CIELAB) |
|---|---|
| D65 | 0.29 |
| C | 0.46 |
| A | 3.19 |
| F1 | 3.02 |

TABLE 6

Design of the orange filter

| Number | Material | Thickness(nm) |
|---|---|---|
| 1 | $Ta_2O_5$ | 54.12 |
| 2 | $SiO_2$ | 66.84 |
| 3 | $Ta_2O_5$ | 43.27 |
| 4 | $SiO_2$ | 66.12 |
| 5 | $Ta_2O_5$ | 69.01 |
| 6 | $SiO_2$ | 9.45 |
| 7 | $Ta_2O_5$ | 68.70 |
| 8 | $SiO_2$ | 75.16 |
| 9 | $Ta_2O_5$ | 53.49 |
| 10 | $SiO_2$ | 81.01 |
| 11 | $Ta_2O_5$ | 56.69 |
| 12 | $SiO_2$ | 81.97 |
| 13 | $Ta_2O_5$ | 54.81 |
| 14 | $SiO_2$ | 81.61 |
| 15 | $Ta_2O_5$ | 56.54 |

Metal-Dielectric

In the following, one can see two examples of filters showing the desired effect (Tables Filter 1 and Filter 2).

Filter 1:

| Number | Material | Thickness(nm) |
|---|---|---|
| 1 | $Ta_2O_5$ | 56.58 |
| 2 | $SiO_2$ | 78.86 |
| 3 | $Ta_2O_5$ | 58.19 |
| 4 | $SiO_2$ | 74.68 |
| 5 | $Ta_2O_5$ | 67.84 |
| 6 | Ta | 30.00 |
| 7 | $Ta_2O_5$ | 40.26 |
| 8 | $SiO_2$ | 84.50 |
| 9 | $Ta_2O_5$ | 57.70 |
| 10 | $SiO_2$ | 100.78 |
| 11 | $Ta_2O_5$ | 7.20 |
| 12 | $SiO_2$ | 30.49 |
| 13 | $Ta_2O_5$ | 66.05 |
| 14 | $SiO_2$ | 96.58 |
| 15 | $Ta_2O_5$ | 98.03 |
| 16 | $SiO_2$ | 89.54 |
| 17 | $Ta_2O_5$ | 87.25 |
| 18 | $SiO_2$ | 115.82 |
| 19 | $Ta_2O_5$ | 73.53 |
| 20 | $SiO_2$ | 124.08 |
| 21 | $Ta_2O_5$ | 74.43 |
| 22 | $SiO_2$ | 125.93 |
| 23 | $Ta_2O_5$ | 74.67 |
| 24 | $SiO_2$ | 133.84 |
| 25 | $Ta_2O_5$ | 69.49 |
| 26 | $SiO_2$ | 69.52 |

Filter 2:

| Number | Material | Thickness(nm) |
|---|---|---|
| 1 | $Ta_2O_5$ | 96.46 |
| 2 | $SiO_2$ | 105.46 |
| 3 | $Ta_2O_5$ | 166.77 |
| 4 | $SiO_2$ | 83.77 |
| 5 | Ta | 9.50 |
| 6 | $Ta_2O_5$ | 154.06 |
| 7 | $SiO_2$ | 301.26 |
| 8 | $Ta_2O_5$ | 97.33 |
| 9 | $SiO_2$ | 234.00 |

In the present work, we studied several innovative approaches in the area of ISIS devices. The designed filters could be used in either transmission or reflection. In order to further enhance the filter quality, our future work will concentrate on improving the monitoring technique, diminishing the cost of the devices and applying them to different substrates.

The invention claimed is:

1. An interference security image structure comprising:
an interference filter comprising a plurality of layers and having a spectrum as a function of angle of observation;
a metameric element adjacent said interference filter and appearing to have a same color as said interference filter at at least one angle of observation and a contrasting color as said interference filter at least one other angle of observation, wherein said interference filter and said metameric element appear to have a same color at at least one angle of observation under a plurality of different illumination sources and a contrasting color at at least one other angle of observation.

2. The structure as defined in claim 1, wherein said metameric element comprises an interference filter.

3. The structure as defined in claim 2, wherein said metameric element surrounds said filter.

4. The structure as defined in claim 2, wherein said metameric element has an area substantially of equal size as an area of said filter, and said element and said filter have one adjoining edge.

5. The structure as defined in claim 1, wherein said metameric element comprises a material having predetermined color that is substantially invariant as a function of angle of observation.

6. The structure as defined in claim 5, wherein said metameric element surrounds said filter.

7. The structure as defined in claim 5, wherein said metameric element has an area substantially of equal size as an area of said filter, and said element and said filter have one adjoining edge.

8. The structure as defined in claim 1, wherein said metameric element surrounds said filter.

9. The structure as defined in claim 8, wherein said metameric element and said filter appear to have a same color when viewed at normal incidence.

10. The structure as defined in claim 1, wherein said metameric element has an area substantially of equal size as an area of said filter, and said element and said filter have one adjoining edge.

11. The structure as defined in claim 10, wherein said metameric element and said filter appear to have a same color when viewed at normal incidence.

12. The structure as defined in claim 1, wherein said metameric element and said filter appear to have a same color when viewed at normal incidence.

13. The structure as defined in claim 1, wherein said structure is adapted to be viewed in a reflective mode.

14. The structure as defined in claim 1, wherein said structure is adapted to be viewed in a transmission mode.

15. An interference security image structure comprising:
an interference filter comprising a plurality of layers and having a spectrum as a function of angle of observation;
a metameric element adjacent said interference filter and appearing to have a same color as said interference filter at least one angle of observation and a contrasting color as said interference filter at least one other angle of observation,
wherein said plurality of layers includes an absorbing thin film, and said structure comprises a support structure for said layers, said support structure adapted to allow said layers to be seen from a top and a bottom side, said layers being adapted to have different spectra as a function of angle of observation in reflection and transmission wherein said layers are adapted to have different spectra as a function of angle of observation in reflection from each side of said structure.

16. An interference security image structure comprising a plurality of interference filter layers including an absorbing thin film, and a support structure for said layers, said support structure adapted to allow said layers to be seen from the top and the bottom side of the support structure, said layers being adapted to have different spectra as a function of angle of observation in reflection and transmission wherein said layers are adapted to have different spectra as a function of angle of observation in reflection from each side of said structure.

17. The structure as defined in claim 16, wherein said structure appears to have a same color at normal incidence in reflection from each side of said structure.

18. The structure as defined in claim 16, wherein said structure appears to have a contrasting color at normal incidence in reflection from each side of said structure.

19. The structure as defined in claim 16, wherein said structure appears to have a contrasting color at normal incidence in reflection and transmission from at least one side of said structure.

20. The structure as defined in claim 16, wherein said layers are adapted to have different reflection spectra when viewed from both sides and an identical transmission spectrum, said spectra varying as a function of the angle of observation.

* * * * *

UNITED STATES PATENT AND TRADEMARK OFFICE
CERTIFICATE OF CORRECTION

PATENT NO. : 8,064,632 B2
APPLICATION NO. : 11/738674
DATED : November 22, 2011
INVENTOR(S) : Bill Baloukas and Ludvik Martinu It is certified that error appears in the above-identified patent and that said Letters Patent is hereby corrected as shown below:

On the title page, change item [73] Assignee:

"Montf" to

"Montreal"

Signed and Sealed this
Twentieth Day of August, 2013

Teresa Stanek Rea
*Acting Director of the United States Patent and Trademark Office*